United States Patent
Jiang et al.

(10) Patent No.: US 12,214,456 B2
(45) Date of Patent: Feb. 4, 2025

(54) DEVICE FOR MOUNTING SPRING PIECES ON MACHINE HOUSING

(71) Applicant: HENGDIAN GROUP INNUOVO ELECTRIC CO., LTD., Dongyang (CN)

(72) Inventors: Haojie Jiang, Dongyang (CN); Junjian Lu, Dongyang (CN)

(73) Assignee: HENGDIAN GROUP INNUOVO ELECTRIC CO., LTD., Dongyang (CN)

(*) Notice: Subject to any disclaimer, the term of this patent is extended or adjusted under 35 U.S.C. 154(b) by 546 days.

(21) Appl. No.: 17/610,122

(22) PCT Filed: Apr. 27, 2020

(86) PCT No.: PCT/CN2020/087194
§ 371 (c)(1),
(2) Date: Nov. 9, 2021

(87) PCT Pub. No.: WO2021/135001
PCT Pub. Date: Jul. 8, 2021

(65) Prior Publication Data
US 2022/0212298 A1    Jul. 7, 2022

(30) Foreign Application Priority Data
Dec. 31, 2019    (CN) .......................... 201911421116.1

(51) Int. Cl.
*B23P 19/04* (2006.01)
(52) U.S. Cl.
CPC .................. *B23P 19/048* (2013.01)
(58) Field of Classification Search
CPC .......... B23P 19/001–008; B23P 19/48; H02K 1/17–187; H02K 15/03;
(Continued)

(56) References Cited

U.S. PATENT DOCUMENTS 2,840,892 A * 7/1958 Erdmann ................ B25B 27/20
29/229
3,199,184 A * 8/1965 Harris ..................... B23P 19/00
29/56.5
(Continued)

FOREIGN PATENT DOCUMENTS

CN    105014348    11/2015
CN    105081750    11/2015
(Continued)

OTHER PUBLICATIONS

Machine translation of CN-106863189-A to Zhao, "Zhao Translation" (Year: 2017).*

(Continued)

*Primary Examiner* — Steven M Cernoch
*Assistant Examiner* — Jonathan R Zaworski
(74) *Attorney, Agent, or Firm* — Jiwen Chen; Joywin IP Law PLLC

(57) ABSTRACT

An objective of the present invention is to provide a device for mounting spring pieces on a machine housing that can enable high-accuracy press-fitting of the spring piece without any damages to magnetic shoes. The present invention comprises a base plate on which a housing positioning base and a first press are provided; a loading holder, having feeding carriages fixed on side faces thereof, is provided above the housing positioning base; a lifting block, which is provided with several first guide rods extending down onto a lower side thereof, is provided at an output end of the first press, and the loading holder is linked with and located below the lifting block; the loading holder is provided with first guide slots each having an upward opening to fit to the first guide rod as well as loading slots running vertically, and the lifting block is fixed to hold-down plates each extending downward so that a lower end of each hold-down plate extends into the loading slot; and the feeding carriage is (Continued)

provided with a receiving groove which is communicated with the loading slots and configured to receive the spring pieces laminated from side to side.

8 Claims, 4 Drawing Sheets

(58) Field of Classification Search
CPC .... H02K 15/02–028; H02K 15/14–165; Y10T 29/49009–49012; Y10T 29/49872; Y10T 29/49876; Y10T 29/53143; Y10T 29/53261; Y10T 29/53313; Y10T 29/53478; Y10T 29/53613–53635
USPC ................................. 29/225–230, 732–736; 310/154.14–154.15
See application file for complete search history.

(56) References Cited

U.S. PATENT DOCUMENTS

| | | | | | |
|---|---|---|---|---|---|
| 3,447,225 | A | * | 6/1969 | Eminger | H02K 15/068 29/809 |
| 3,501,827 | A | * | 3/1970 | Munse | B25B 31/00 29/225 |
| 3,708,849 | A | * | 1/1973 | Meyer | B23P 19/04 29/785 |
| RE27,591 | E | * | 3/1973 | Munse | B25B 31/00 29/225 |
| 3,805,357 | A | * | 4/1974 | Peters | H02K 15/0018 29/734 |
| 3,872,568 | A | * | 3/1975 | Morr | H02K 15/068 29/736 |
| 4,476,625 | A | * | 10/1984 | Bricker | H02K 15/10 29/736 |
| 5,095,611 | A | * | 3/1992 | Smith | H02K 5/1672 310/90 |
| 5,874,794 | A | * | 2/1999 | Trammell | H02K 1/17 310/154.14 |
| 6,378,187 | B1 | * | 4/2002 | Walker | B23P 19/001 29/225 |
| 6,739,034 | B2 | * | 5/2004 | Suzuki | H02K 15/16 29/736 |
| 7,358,636 | B2 | * | 4/2008 | Suga | H02K 1/17 310/154.14 |
| 7,757,376 | B2 | * | 7/2010 | Saitou | H01F 7/0289 29/609.1 |
| 2001/0020324 | A1 | * | 9/2001 | Suzuki | B23P 19/00 29/596 |
| 2013/0087265 | A1 | * | 4/2013 | Takaichi | H01F 41/0253 156/60 |

FOREIGN PATENT DOCUMENTS

| | | | | |
|---|---|---|---|---|
| CN | 106695305 | | 5/2017 | |
| CN | 106863189 | A * | 6/2017 | |
| CN | 108494191 | A * | 9/2018 | ............... H02K 1/17 |
| CN | 108942186 | | 12/2018 | |

OTHER PUBLICATIONS

Machine translation of CN-108494191-A to Lu, "Lu Translation" (Year: 2018).*

* cited by examiner

DEVICE FOR MOUNTING SPRING PIECES ON MACHINE HOUSING

This is a U.S. national stage application of PCT Application No. PCT/CN2020/087194 under 35 U.S.C. 371, filed Apr. 27, 2020 in Chinese, claiming priority of Chinese Application No. 201911421116.1, filed Dec. 31, 2019, all of which are hereby incorporated by reference.

TECHNICAL FIELD OF THE INVENTION

The present invention relates to an apparatus for assembling motor parts, in particular to a device for mounting spring pieces on a machine housing.

BACKGROUND OF THE INVENTION

A spring piece shown in FIGS. 1 and 2 has a W-shaped cross-section and chamfers at one end. If the spring piece needs to be press-fitted into a motor housing, a worker will glue and fix magnetic shoes to an inner wall of the housing, and then press-fit the spring piece between the two adjacent magnetic shoes to avoid the magnetic shoes from shifting against each other.

In the prior art, a spring piece is press-fitted by a worker with a hammer, which makes it difficult to implement vertical downward press-fitting, and the spring piece is is easy to cause damage to the magnetic shoes during the hammer strike. Moreover, it is difficult for the worker to ensure the press-fitting position of the spring piece each time, and the spring piece will occupy the space of end covers, making it difficult to fix the end covers to the housing.

SUMMARY OF THE INVENTION

An object of the present invention is to provide a device for mounting spring pieces on a machine housing that can enable high-accuracy press-fitting of the spring piece without any damages to magnetic shoes.

To achieve the above object, a technical solution employed in the present invention is as follows. A device for mounting spring pieces on a machine housing is provided, comprising a base plate on which a housing positioning base and a first press are provided; a loading holder, having feeding carriages fixed on side faces thereof, is provided above the housing positioning base; a lifting block, which is provided with several first guide rods extending down onto a lower side thereof, is provided at an output end of the first press, and the loading holder is linked with and located below the lifting block; the loading holder is provided with first guide slots each having an upward opening to fit to the first guide rod as well as loading slots running vertically, and the lifting block is fixed to hold-down plates each extending downward so that a lower end of each hold-down plate extends into the loading slot; and the feeding carriage is provided with a receiving groove which is communicated with the loading slots and configured to receive the spring pieces laminated from side to side, a fixed block and a movable block between which a first compression spring is provided are provided in the receiving groove, and the movable block drives the spring piece to move toward the loading slots under the action of the first compression spring.

During use of the device according to the present invention, a worker puts the machine housing on the housing positioning base, and then activates the first press to drive the loading holder to move down. When the loading holder is supported on the machine housing or on the housing positioning base, the hold-down plates continue to be pressed down under the action of the first press to press the spring pieces in the loading slots to move down and then to be press-fitted between the two adjacent magnetic shoes. When the first press is reset to drive the loading holder to move upward, the hold-down plates will move upward first. With the movement of the hold-down plates, the spring piece will be pressed into the loading slots under the action of the movable block and the first compression spring for press-fitting the next spring piece. According to the present invention, the automatic press-fitting and loading of the spring piece can be realized, and the hold-down plates that press the spring piece will move vertically to avoid the spring piece from hitting side faces of the magnetic shoes and thus to avoid damage to the magnetic shoes. As long as the stroke of the lifting block of the first press is unchanged each time, it is possible to ensure that the stroke of the hold-down plates is unchanged every time when the spring piece is press-fitted into the same batch of machine housings, thus the spring pieces are fitted more accurately in the axial direction of the machine housing, and end covers at both ends of the machine housing are fitted to the machine housing more simply. The shape of the hold-down plate depends on the actual shape of the spring piece to make the hold-down plates only push down one spring piece at a time.

Preferably, guide blocks and second guide slots fitted to each other are provided between inner walls of the receiving groove and sidewalls of the movable block, the guide block extends into the second guide slot, and the movable block moves along the second guide slot under the action of the first compression spring. The second guide slots and the guide blocks are provided to avoid the movable block tilting during the movement.

Preferably, one end of a second guide rod is fixed to the movable block, while the other end thereof extends away from the loading slots; the fixed block is provided with third guide slots which are fitted to the second guide rods and run through the fixed block, the second guide rod extends away from the movable block to run through the fixed block to an outer side of the feeding carriage, and a stop block is fixed at one end of the second guide rod away from the movable block; and the first compression spring is sleeved on the second guide rod. The second guide rod is configured to guide the movable block and also to set the first compression spring.

Preferably, there are at least two hold-down plates; several hold-down plates and several feeding carriages are annularly spaced around a circumferential side of the first guide rod, and one hold-down plate corresponds to one feeding carriage. According to the present invention, a plurality of spring pieces can be press-fitted at one time, so that the production efficiency is improved.

Preferably, a stop pin is fixed on each hold-down plate, and the loading holder is provided with bar-shaped slots which are vertically provided and parallel to the loading slots; and the width of the spring piece is greater than that of the bar-shaped slot, one end of the stop pin is fixed to the hold-down plate, while the other end thereof is located in the bar-shaped slot. The stop pin is configured to guide the hold-down plates to move up and down and also to prevent the hold-down plates from separating from the loading holder.

Preferably, a second compression spring is sleeved on each first guide rod to facilitate the reset of the hold-down plates. When the first press is reset, the hold-down plates will move upward, and the loading holder will reset upward only after the hold-down plates move a certain distance relative hereto.

Preferably, a middle portion of the hold-down plate extends toward the feeding carriage to form an arc-shaped bulge or convex; when the hold-down plate moves down to be in contact with the spring piece, front and rear ends of the hold-down plate are in contact with upper end faces of protrusions of the spring piece, and the arc-shaped bulge of the hold-down plate is in contact with an upper end face of the arc-shaped portion of the spring piece; and the thickness of both front and rear ends of the hold-down plate is less than that of the spring piece. Such arrangement increases the contact area between the hold-down plates and the spring piece, so as to improve the press-fitting efficiency of the spring pieces.

Preferably, a bulge, through which the loading slot runs down, is provided at a lower end of the loading holder, and the loading holder moves down under the action of the first press and then is supported on the machine housing so that the bulge extends into the machine housing. Such arrangement reduces the vertical displacement distance of the spring piece so that the spring piece can be fitted in place after being moved out of the loading slot.

Preferably, a second press is provided on a lower side of the base plate, and a press piece, which extends upward into the housing positioning base, is provided at a front end of an output end of the second press; when the machine housing is positioned on the housing positioning base, the press piece moves radially along the machine housing under the action of the second press, and bosses for placing the magnetic shoes are provided at a lower end of the second press. According to the present invention, the device may also be used for gluing and fixing the magnetic shoes. Before the press-fitting of the spring piece, the magnetic shoes are put on the boss, while glue is applied on the inner wall of the machine housing. Then, the second press is activated to glue and fix the magnetic shoes to the machine housing, and then the hold-down plates remain stationary so that the magnetic shoes still rest on the bosses. The spring piece is press-fitted last to avoid as much as possible the downward movement of the magnetic shoes under the action of the spring piece.

Preferably, a lifter is fixed to the lower side of the base plate, and a lifting shaft of the lifter is vertically disposed, and a lifting plate, to which the second press is fixed, is fixed to the top of the lifting shaft. Such arrangement makes it easier to place the magnetic shoes.

The present invention has the advantages of being able to enable high-accuracy press-fitting of the spring pieces without any damages to the magnetic shoes.

DETAILED DESCRIPTION OF THE INVENTION

The present invention will be further described as below with reference to the accompanying drawings by specific embodiments.

Figure 1:
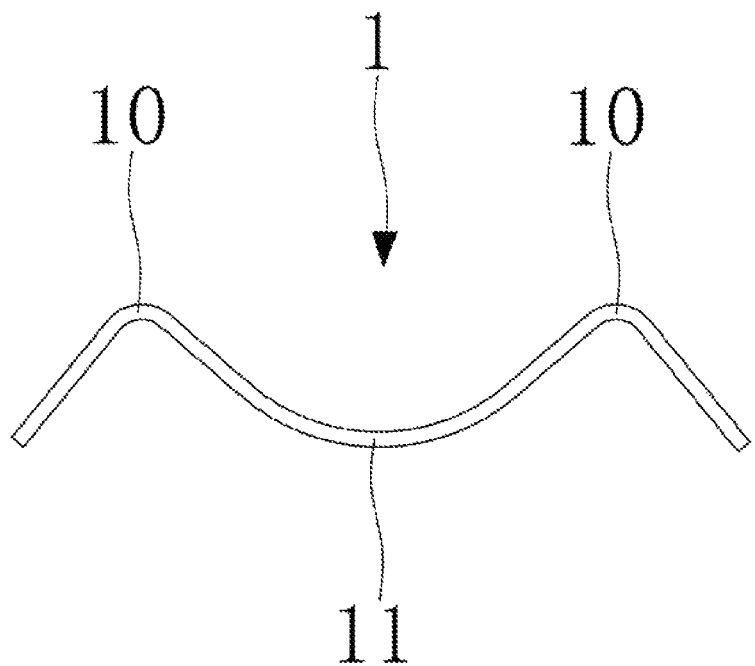
FIG. 1 is a structural diagram of a spring piece.
Figure 2:
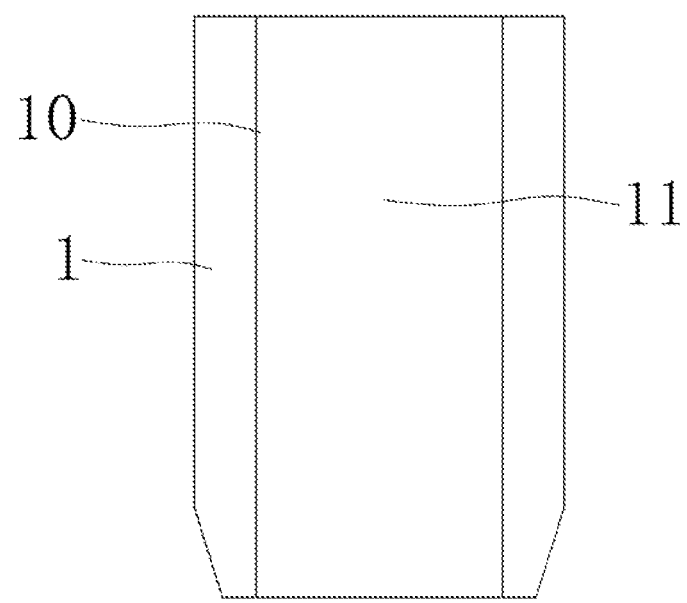
FIG. 2 is another structural diagram of the spring piece.
Figure 3:
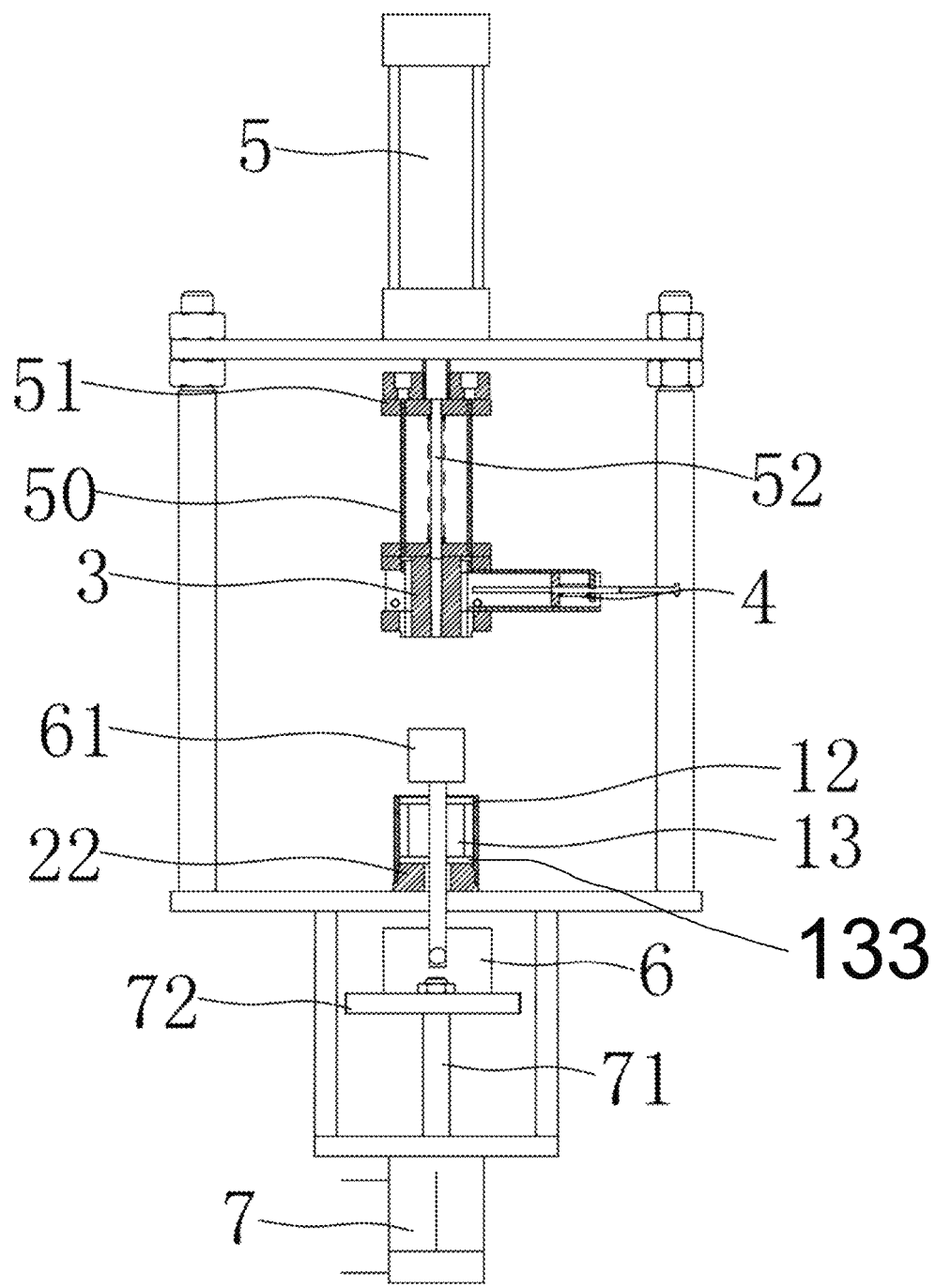
FIG. 3 is a structural diagram according to the present invention.
Figure 4:
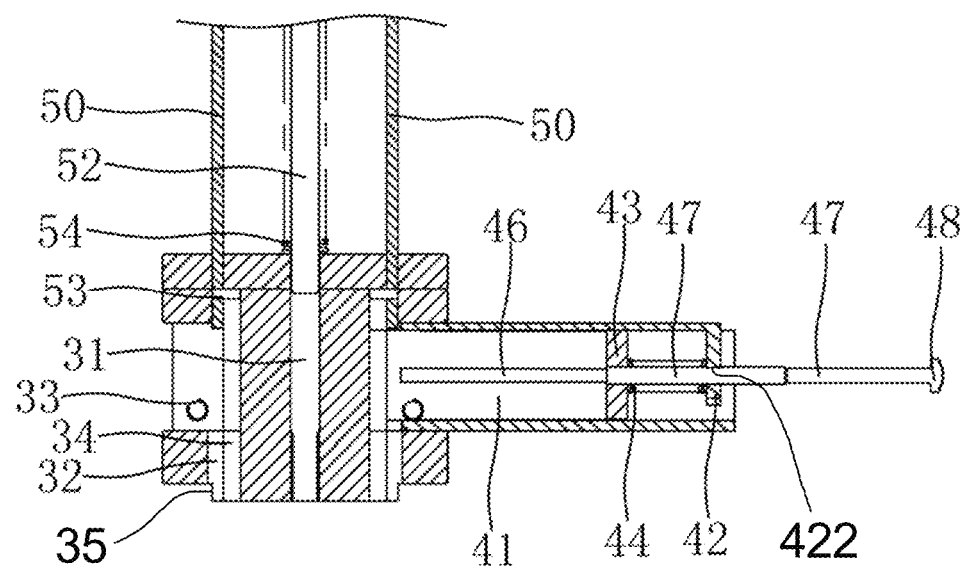
FIG. 4 is a structural diagram of a loading holder and a feeding carriage according to the present invention.
Figure 5:
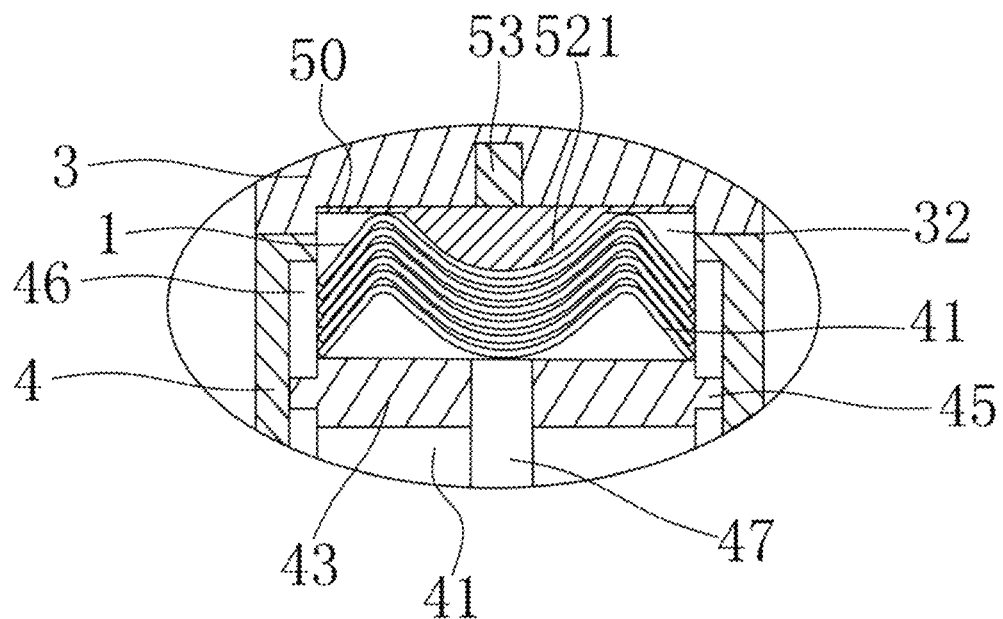
FIG. 5 is another structural diagram of the loading holder and the feeding carriage according to the present invention.
Figure 6:
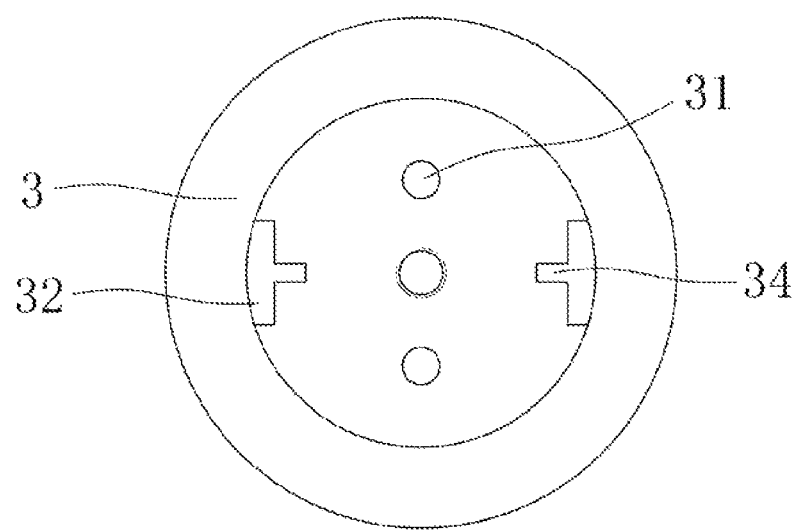
FIG. 6 is a bottom view of the loading holder according to the present invention.

As shown in FIGS. 1 to 2, a spring piece 1 in this embodiment has an M-shaped cross section, an arc-shaped portion 11 in the middle and chamfers at one end, and two protrusions 10 are located at positions where the spring piece 1 bends.

It is necessary to fix two magnetic shoes 13 and two spring pieces 1 on an inner wall of a machine housing 12.

As shown in FIGS. 3 to 6, a device for mounting spring pieces on a machine housing is provided, comprising a base plate 21 on which a housing positioning base 22 and a first press 5 are provided. A loading holder 3, having feeding carriages 4 fixed on side faces thereof, is provided above the housing positioning base 22. A lifting block 51, which is provided with three first guide rods 52 extending down onto a lower side thereof, is provided at an output end of the first press 5, and the loading holder 3 is linked with and located below the lifting block 51. The loading holder 3 is provided with first guide slots 31 each having an upward opening to fit to the first guide rod 52 as well as loading slots 32 running vertically, and the lifting block 51 is fixed to hold-down plates 50 each extending downward so that a lower end of each hold-down plate extends into the loading slot 32. The feeding carriage 4 is provided with a receiving groove 41 which is communicated with the loading slots 32 and configured to receive the spring pieces 1 laminated from side to side, a fixed block 42 and a movable block 43 between which a first compression spring 44 is provided are provided in the receiving groove 41, and the movable block 43 drives the spring pieces 1 to move toward the loading slot 32 under the action of the first compression spring 44. A second compression spring 54 is sleeved on each first guide rod 52.

Guide blocks 45 and second guide slots 46 fitted to each other are provided between front and rear inner walls of the receiving groove 41 and front and rear sidewalls of the movable block 43. The guide block 45 extends into the second guide slot 46 and the movable block 43 moves along the second guide slot 46 under the action of the first compression spring 44. The second guide slots 46 are provided on the front and rear inner walls of the receiving groove, and the guide blocks 45 are provided on the movable block 43. One end of a second guide rod 47 is fixed to the movable block 43, while the other end thereof extends away from the loading slots 32. The fixed block 42 is provided with third guide slots 422 which are fitted to the second guide rods 47 and run through the fixed block 42, the second guide rod 47 extends away from the movable block 43 to run through the fixed block 42 to an outer side of the feeding carriage 4, and a stop block is fixed at one end of the second guide rod 47 away from the movable block 43. The first compression spring 44 is sleeved on the second guide rod 47.

There are two hold-down plates 50 symmetrically disposed on left and right sides. The two hold-down plates 50 and the two feeding carriages 4 are annularly spaced around a circumferential side of the first guide rod 52, and one hold-down plate 50 corresponds to one feeding carriage 4. In this embodiment, one feeding carriage 4 is provided on left and right sides of the loading holder, respectively, and the feeding carriage 4 on the left side is not shown. The feeding carriage 4 is fixed to the loading holder by binding bolts, and the loading holder is provided with threaded holes 33 fitted to the binding bolts.

A stop pin 53 is fixed to each hold-down plate 5, and the loading holder 3 is provided with bar-shaped slots 34 which are vertically provided and parallel to the loading slots 32. The width of the spring piece 1 is greater than that of the bar-shaped slot 34 and that of the stop pin 53. One of left and right ends of the stop pin 53 is fixed to the hold-down plate, while the other end thereof is located in the bar-shaped slot.

A middle portion of the hold-down plate 50 extends toward the feeding carriage 4 to form an arc-shaped bulge 521. When the hold-down plate 50 moves down to be in contact with the spring piece 1, front and rear ends of the hold-down plate 50 are in contact with upper end faces of the protrusions 10 of the spring piece 1, and the arc-shaped bulge 521 of the hold-down plate 50 is in contact with an upper end face of the arc-shaped portion 11 of the spring piece 1. The thickness of both front and rear ends of the hold-down plate 50 is less than that of the spring piece 1.

A bulge 35, through which the loading slot 32 runs down, is provided at a lower end of the loading holder 3, and the loading holder 3 moves down under the action of the first press 5 and then is supported on the machine housing 12 so that the bulge 35 extends into the machine housing 12.

A second press 6 is provided on a lower side of the base plate 21, and a press piece 61, which extends upward into the housing positioning base 22 and is provided with bosses 133 for placing the magnetic shoes 13 at a lower end thereof, is provided at a front end of an output end of the second press 6. When the machine housing 12 is positioned on the housing positioning base 22, the press piece 61 moves radially along the machine housing 12 under the action of the second press 6. Front and rear edges of a section of the press piece 61 are arc-shaped, and the bosses are provided on both front and rear sides of the lower end of the press piece 61. A lifter 7 is fixed to the lower side of the base plate 21, and a lifting shaft 71 of the lifter 7 is vertically disposed, and a lifting plate 72, to which the second press 6 is fixed, is fixed to the top of the lifting shaft 71.

During use of the device according to the present invention, a worker first applies glue on an inner wall of the machine housing, puts the machine housing on the housing positioning base, controls the lifter to enable the press piece to be located above the machine housing, then puts the two magnetic shoes symmetrically on front and rear sides of the bosses of the press piece, makes the press piece drop into the machine housing by the lifter, and finally activates the second press to control the press piece to move back and forth in the radial direction of the machine housing so that the two magnetic shoes are fixed to the inner wall of the machine housing successively.

Then, the worker activates the first press to drive the loading holder to move down. When the loading holder is supported on the machine housing, the bulges of the loading holder are located on an upper side of the magnetic shoe and on the machine housing. With the continuous operation of the first press, the hold-down plates move down under the action of the first press, and press the spring pieces in the loading slots to move down and then to be fitted between the two adjacent magnetic shoes.

Finally, the worker resets the first press and takes out the machine housing for fixing parts to the next machine housing. When the first press is reset to drive the loading holder to move upward, the hold-down plates will move upward first. With the movement of the hold-down plates, the spring piece will be pushed into the loading slot under the action of the movable block and the first compression spring for press-fitting the next spring piece.

The present invention has the advantages of being able to enable high-accuracy press-fitting of the spring pieces without any damages to the magnetic shoes.

The invention claimed is:

1. A device for mounting spring pieces on a machine housing, comprising
   a base plate on which a housing positioning base and a first press are provided;
   a loading holder, having a feeding carriage fixed on a side face thereof, is provided above the housing positioning base;
   a lifting block, which is provided with a first guide rod extending down onto a lower side thereof, is provided at an output end of the first press, and the loading holder is linked with and located below the lifting block;
   the loading holder is provided with a first guide slot having an upward opening to fit to the first guide rod as well as a loading slot running vertically, and the lifting block is fixed to a hold-down plate extending downward so that a lower end of the hold-down plate extends into the loading slot;
   and the feeding carriage is provided with a receiving groove which is communicated with the loading slot and configured to receive the spring pieces, a fixed block and a movable block are provided in the receiving groove, a first compression spring is provided between the fixed block and the movable block, and
   the movable block drives the spring piece to move toward the loading slot under the action of the first compression spring;
   wherein one end of a second guide rod is fixed to the movable block, while the other end thereof extends away from the loading slot; the fixed block is provided with a third guide slot which is fitted to the second guide rod and run through the fixed block, the second guide rod extends away from the movable block to run through the fixed block to an outer side of the feeding carriage, and a stop block is fixed at one end of the second guide rod away from the movable block; and the first compression spring is sleeved on the second guide rod.

2. The device for mounting spring pieces on a machine housing according to claim 1, wherein a guide block and a second guide slot fitted to each other are provided between inner walls of the receiving groove and sidewalls of the movable block, the guide block extends into the second guide slot, and the movable block moves along the second guide slot under the action of the first compression spring.

3. The device for mounting spring pieces on a machine housing according to claim 1, wherein a stop pin is fixed on the hold-down plate, and the loading holder is provided with a bar-shaped slot which is vertically provided and parallel to the loading slot; and a width of the spring piece is greater than that of the bar-shaped slot, one end of the stop pin is fixed to the hold-down plate, while the other end thereof is located in the bar-shaped slot.

4. The device for mounting spring pieces on a machine housing according to claim 1, wherein a second compression spring is sleeved on the first guide rod.

5. The device for mounting spring pieces on a machine housing according to claim 1, wherein a second press is provided on a lower side of the base plate, and a press piece, which extends upward into the housing positioning base, is provided at a front end of an output end of the second press; when the machine housing is positioned on the housing positioning base, the press piece moves radially along the machine housing under the action of the second press, and bosses for placing the magnetic shoes are provided at a lower end of the second press.

6. The device for mounting spring pieces on a machine housing according to claim 5, wherein a lifter is fixed to the lower side of the base plate, a lifting shaft of the lifter is vertically disposed, and a lifting plate, to which the second press is fixed, is fixed to the top of the lifting shaft.

7. A device for mounting spring pieces on a machine housing, comprising
   a base plate on which a housing positioning base and a first press are provided;
   a loading holder, having a feeding carriage fixed on a side face thereof, is provided above the housing positioning base;
   a lifting block, which is provided with a first guide rod extending down onto a lower side thereof, is provided at an output end of the first press, and the loading holder is linked with and located below the lifting block;
   the loading holder is provided with a first guide slot having an upward opening to fit to the first guide rod as well as a loading slot running vertically, and the lifting block is fixed to a hold-down plate extending downward so that a lower end of the hold-down plate extends into the loading slot;
   and the feeding carriage is provided with a receiving groove which is communicated with the loading slot and configured to receive the spring pieces, a fixed block and a movable block are provided in the receiving groove, a first compression spring is provided between the fixed block and the movable block, and
   the movable block drives the spring piece to move toward the loading slot under the action of the first compression spring;
   wherein a middle portion of the hold-down plate extends toward the feeding carriage to form an arc-shaped bulge;
   when the hold-down plate moves down to be in contact with the spring piece, front and rear ends of the hold-down plate are in contact with upper end faces of protrusions of the spring piece, and the arc-shaped bulge of the hold-down plate is in contact with an upper end face of an arc-shaped portion of the spring piece;
   and a thickness of both front and rear ends of the hold-down plate is less than that of the spring piece.

8. A device for mounting spring pieces on a machine housing, comprising
   a base plate on which a housing positioning base and a first press are provided;
   a loading holder, having a feeding carriage fixed on a side face thereof, is provided above the housing positioning base;
   a lifting block, which is provided with a first guide rod extending down onto a lower side thereof, is provided at an output end of the first press, and the loading holder is linked with and located below the lifting block;
   the loading holder is provided with a first guide slot having an upward opening to fit to the first guide rod as well as a loading slot running vertically, and the lifting block is fixed to a hold-down plate extending downward so that a lower end of the hold-down plate extends into the loading slot;
   and the feeding carriage is provided with a receiving groove which is communicated with the loading slot and configured to receive the spring pieces, a fixed block and a movable block are provided in the receiving groove, a first compression spring is provided between the fixed block and the movable block, and
   the movable block drives the spring piece to move toward the loading slot under the action of the first compression spring;
   wherein a bulge, through which the loading slot runs down, is provided at a lower end of the loading holder, and the loading holder moves down under the action of the first press and then is supported on the machine housing so that the bulge extends into the machine housing.

* * * * *